UNITED STATES PATENT OFFICE.

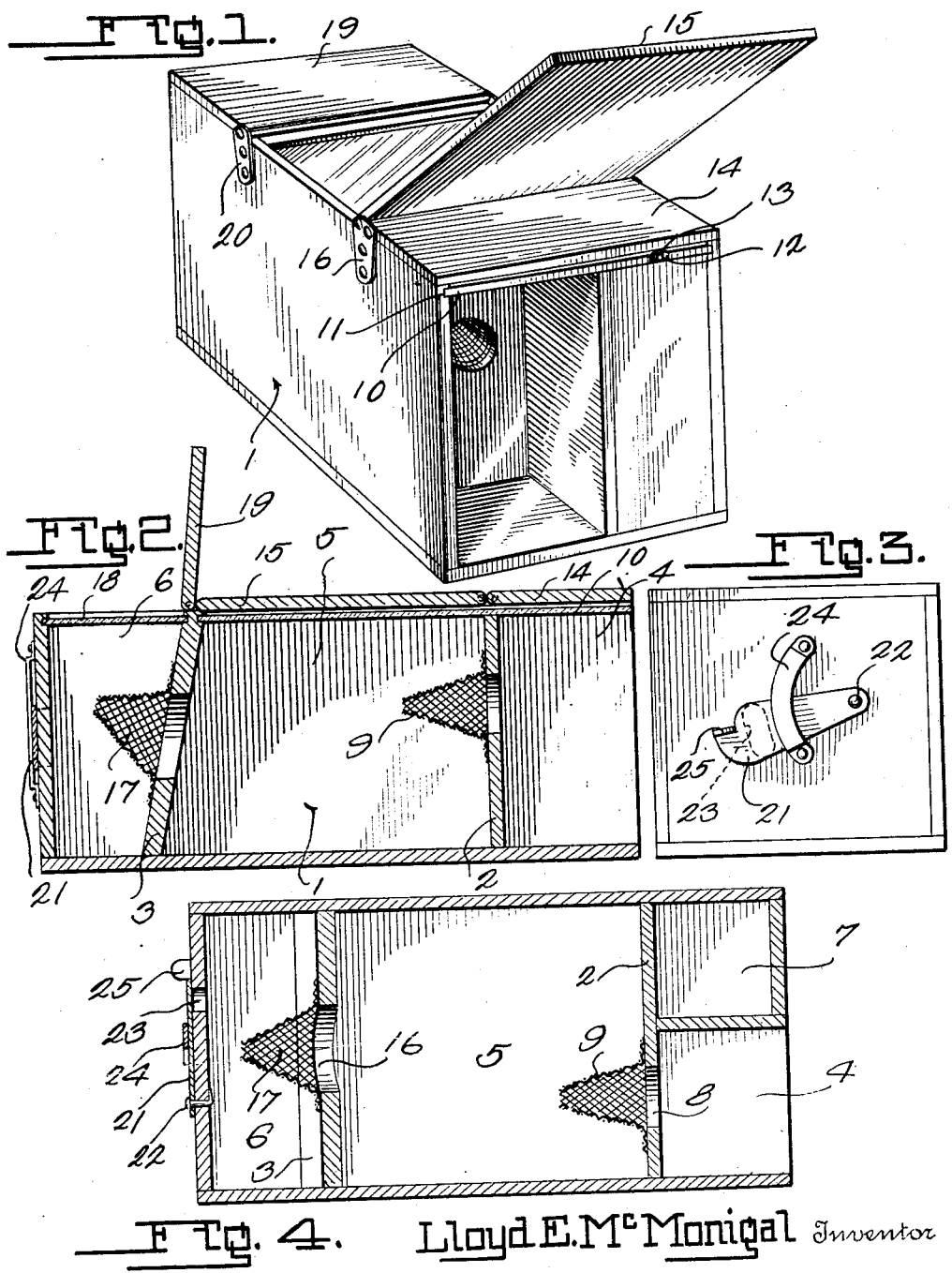

LLOYD E. McMONIGAL, OF McCARTNEY, PENNSYLVANIA.

BEE-TRAP.

1,371,318.  Specification of Letters Patent.  Patented Mar. 15, 1921.

Application filed October 1, 1918. Serial No. 256,408.

*To all whom it may concern:*

Be it known that I, LLOYD E. McMONIGAL, a citizen of the United States, and a resident of McCartney, in the county of Clearfield and State of Pennsylvania, have invented certain new and useful Improvements in Bee-Traps, of which the following is a specification.

This invention relates to a bee trap, and an object of the invention is to provide a trap for catching honey bees, and retaining them, until it is desired to release them, for use particularly in trailing wild bees to their hives.

In tracing wild bees to their hives, a trap or box having a well known bee scent therein, which scent is usually mixed with the spoon, is used for catching the bees and after they have fed, they are released, and watched as they fly to their hives. However, it is a well known fact that the scent, which attracts the bees is injurious to the bee if he taste some of the same, and also, with boxes or traps ordinarily used for this purpose, the bees previously caught are apt to escape, while catching additional bees, and it is an object of this invention to provide a bee trap wherein the scent for attracting the bees is retained in a separate compartment shut off from the compartment which retains the bees, so as to make it impossible for the bees to gain access to the attractor or scent and also to provide a device or trap having a plurality of compartments, namely an entrance compartment, alongside of which the scent retaining compartment is positioned, a feeding compartment, and a retaining compartment into which the bees pass after they have fed, and from which they are released, one at a time, so as to enable the person catching them in the trap, to follow their flight to their hives.

Other objects of the invention will appear in the following detailed description, taken in connection with the accompanying drawing, forming a part of this specification, and in which drawing:

Figure 1 is a perspective view of the improved bee trap.

Fig. 2 is a longitudinal vertical section through the trap.

Fig. 3 is an end view of the outlet end of the trap, and

Fig. 4 is a horizontal longitudinal section through the trap.

Referring more particularly to the drawing, 1 indicates the main body of the trap which is substantially rectangular in shape and has forward and rearward partitions 2 and 3 respectively extending therethrough, dividing the interior of the trap body into an entrance compartment 4, an intermediate or feeding compartment 5 and a retaining or outlet compartment 6. The entrance compartment 4 has one side portion thereof cut off and inclosed by suitable walls forming a compartment 7 which is adapted to retain any well known scent which will attract bees. The entrance compartment 4 has communication with the feed compartment 5 through an opening 8 formed in the partition 2 and a cone or conical lead 9 is attached to the inner surface of the partition 2 having its apex cut away and extending inwardly into the compartment 5, so as to allow the bee passing through the opening 8 to pass through the cone lead 9 into the compartment 5 for feeding. The cone lead 9 is made of wire mesh, and by this construction, the bees will become confused when endeavoring to pass out of the compartment 5 through this cone member, and will be kept in the compartment 5, it being a well known fact that insects, flies, bees or the like, are generally unable to find their ways through cone leads, when endeavoring to enter at the outlet or apex ends thereof. The compartment 5 contains any suitable feed for the bees, such as pea flour, or the like, and the bees entering this compartment feed upon the food therein.

The top wall of the body 1, of the compartments 4 and 5, is formed of a plate 10 of glass or other transparent material which is slidably carried in grooves 11 formed in the upstanding sides of the body 1. The plate 10 has a notch 12 formed therein in which is seated a removable pin 13 carried by the outer wall of the compartment 7, by removing this pin 13, the transparent upper wall or top 10 may be removed, for permitting the placing of food in the compartment 5 and the attractor in the compartment 7. The body 1 has covers 14 and 15 hingedly connected thereto by means of straps 16 and these covers are adapted to fold over the compartments 4 and 5 respectively.

In use, the bees will be attracted to the trap by the scent in the compartment 7 and entering the entrance compartment 4 will be further attracted by the food in the compartment 5, and they will pass through the lead 9 into the compartment 5. During use, the covers 14 and 15 are in their closed positions, cutting off the light from the compartments 4 and 5 and thus after the bees have eaten the desired quantity of the food, they will naturally seek the light, and since they will be unable to pass out through the lead 9, will pass through the opening 16 formed in the compartment 3, and through the lead 17 into the compartment 6. The lead 17 is formed identically with the construction of the lead 9, so as to permit the bees to enter the compartment 6, but prevent them from leaving this compartment for entering the compartment 5. The top of the compartment 6 is formed of a transparent plate 18, and a cover 19 is hingedly connected to the body 1 by means of straps 20, so that when it is desired, the compartment 6 may be made dark. However, in use, the cover 19 is raised, which permits the compartment 6 to be lighted for attracting the bees thereinto. The bees may be retained in the compartment 6, until it is desired to follow them to the bee tree after which the slidable closure 21 is moved upon its pivot 22 to open the opening 23 and permit the bees to pass one at a time out of this opening. The pivoted closure 21 is guided by a suitable arcuate guide 24 and it may have a handle portion 25 formed thereon if it is so desired for facilitating the pivotal movement thereof.

After one bee has been let out of the compartment 6, the opening 23 may be closed, and the person releasing the bee can follow the bee's flight, as far as possible and after he loses the bee, he can release a second bee from the compartment 6 and follow the flight of this bee as far as possible and repeat this operation until he has found the hive of the bees.

When attracting or catching the bees, if it is so desired, the door 19 may be closed, and the door 15 opened, as shown in Fig. 1 of the drawing, thus attracting the bees into the compartment 5 in which the food is placed and then when it is desired to release the bees, the cover 15 may be closed and the cover 19 opened, so as to cause the bees to pass into the compartment 6.

Changes in details may be made without departing from the spirit of this invention; but,

I claim:

1. In a bee trap, the combination of a body providing a plurality of compartments having openings one to another for passage of the bees from one compartment to another, each compartment having a transparency for the admission of light thereinto, non return leads in operative relation to the said openings of said compartments, and covers provided for said transparencies of said compartments which may be successively shifted to permit light to enter the compartments successively to lure the bees from one compartment to another.

2. In a bee trap, the combination, of a substantially rectangular body, a plurality of partitions extending through the body and dividing the same into an entrance compartment, a feeding compartment, and a confining compartment, and leads leading from the entrance compartment into the feeding compartment and from the feeding compartment into the confining compartment to permit bees to pass from the entrance compartment into the feeding compartment and from the latter into the confining compartment but preventing them from passing back into the respective compartments, said confining compartment provided with an outlet opening, a sliding closure for said outlet opening, said entrance compartment provided with partitions therein forming a scent retaining compartment which is shut off from the entrance and feeding compartments.

3. In a bee trap, the combination, of a substantially rectangular body, a plurality of partitions extending through the body and dividing the same into an entrance compartment, a feeding compartment, and a confining compartment, and leads leading from the entrance compartment into the feeding compartment and from the feeding compartment into the confining compartment to permit bees to pass from the entrance compartment into the feeding compartment and from the latter into the confining compartment but preventing them from passing back into the respective compartment, said confining compartment provided with an outlet opening, a sliding closure for said outlet opening, said entrance compartment provided with partitions therein forming a scent retaining compartment which is shut off from the entrance and feeding compartments, a transparent cover slidably carried by said body and forming a closure for the top of said entrance and feeding compartments and a second sliding transparent plate carried by said body and forming a top for said confining compartment.

4. In a bee trap, the combination, of a substantially rectangular body, a plurality of partitions extending through the body and dividing the same into an entrance compartment, a feeding compartment, and a confining compartment, and leads leading from the entrance compartment into the feeding compartment and from the feeding compartment into the confining compartment to permit bees to pass from the entrance compartment into the feeding compartment and from the latter into the confining compartment but preventing them from passing back into the respective compartment, said confining compartment provided with an outlet opening, a sliding closure for said outlet opening, said entrance compartment provided with partitions therein forming a scent retaining compartment which is shut off from the entrance and feeding compartments, a transparent cover slidably carried by said body and forming a closure for the top of said entrance and feeding compartments and a second sliding transparent plate carried by said body and forming a top for said confining compartment, a plurality of doors, one for each respective compartment, hingedly connected to said body and adapted to be folded over said transparent plate.

5. In a bee trap, the combination, of a body, a partition extending through the body and dividing the same into an entrance compartment and a feeding compartment, a non-return lead connecting said compartments, said entrance compartment provided with partitions therein forming a scent retaining compartment which is shut off from the entrance and feeding compartments, and a transparent cover slidably carried by said body and forming a closure for the top of said entrance and feeding compartments.

6. In a bee trap, a body, means in the body for confining insects therein, a transparent plate slidably carried by the body and forming a portion of the top therefor, and a pair of opaque covers hingedly carried by the body for folding over said transparent plate.

7. In a bee trap, the combination, of a substantially rectangular body, a partition extending through the body and dividing the same into an entrance compartment and a feeding compartment, a non-return lead connecting said compartments, said entrance compartment provided with partitions therein forming a scent retaining compartment which is shut off from the entrance and feeding compartments, a transparent cover slidably carried by said body and forming a closure for the top of said entrance and feeding compartments, a plurality of doors carried by said body one for each respective compartment and adjusted to be positioned over said transparent plates.

8. In a bee trap, the combination, of a body having a plurality of compartments therein, means for permitting the entrance of bees into the compartments and to prevent their return out of the compartments, removable transparent covers for said compartments and means carried by the body whereby the passage of light through the transparent covers into the respective compartments may be prevented.

9. In a bee trap, the combination, of a body having a plurality of compartments therein, transparent covers for said compartments and covers for each of said compartments adapted to be positioned over the transparent covers thereof to control the passage of light into the respective compartments.

10. In a bee trap, the combination, of a body, a partition extending through the body and dividing the same into an entrance compartment, a non-return lead connecting said compartments, and a feeding compartment, said entrance compartment provided with partitions therein forming a scent retaining compartment which is shut off from the entrance and feeding compartment, transparent covers for said compartments and covers for each of said compartments carried by said body and adapted to be positioned over the transparent covers thereof to control the passage of light into the respective compartments.

11. In a bee trap, the combination, of a body, a partition extending through the body dividing the same into an entrance compartment and a feeding compartment, a non-return lead connecting said compartments, said entrance compartment provided with partitions therein forming a scent retaining compartment which is shut off from the entrance and feeding compartments, a removable transparent cover for said compartments and opaque covers for said entrance and feeding compartments hingedly carried by the body whereby the passage of light through the transparent covers to either of said compartments may be controlled independently of the other.

LLOYD E. McMONIGAL.